(12) United States Patent
Hiraga et al.

(10) Patent No.: US 6,451,962 B1
(45) Date of Patent: Sep. 17, 2002

(54) METHOD OF STABILIZING FLUORINE-CONTAINING POLYMER

(75) Inventors: Yoshiyuki Hiraga, Settsu (JP); Satoshi Komatsu, Settsu (JP); Tomohisa Noda, Settsu (JP); Yasuhiro Utsumi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/830,969
(22) PCT Filed: Nov. 1, 1999
(86) PCT No.: PCT/JP99/06065
§ 371 (c)(1), (2), (4) Date: May 3, 2001
(87) PCT Pub. No.: WO00/26260
PCT Pub. Date: May 11, 2000

(30) Foreign Application Priority Data

Nov. 4, 1998 (JP) .......... 10-313669
Sep. 3, 1999 (JP) .......... 11-250526

(51) Int. Cl.[7] .................. C08F 6/00
(52) U.S. Cl. ..................... 528/480
(58) Field of Search .................. 528/176, 480

(56) References Cited

FOREIGN PATENT DOCUMENTS

| EP | A-150953 | 8/1985 |
|----|----------|--------|
| EP | A-469759 | 2/1992 |
| EP | A-0870792 | 10/1998 |
| JP | A-61-69805 | 4/1986 |
| WO | WO 98/09784 | 3/1998 |

OTHER PUBLICATIONS

International Search Report for PCT/JP99/06065 dated Feb. 15, 2000.
English translation of International Preliminary Examination Report for PCT/JP99/06065 dated Dec. 27, 2000.

*Primary Examiner*—Terressa M. Boykin
(74) *Attorney, Agent, or Firm*—Sughrue Mion, PLLC

(57) ABSTRACT

To provide the stabilization method, in which unstable groups of melt-processable fluorine-containing polymer having unstable groups can be stabilized rapidly and effectively, and even if the obtained stabilized polymer is melt-molded, an obtained molded article is free from bubbles and cavity and no coloration arises. The method of stabilizing a fluorine-containing polymer by melt-kneading a melt-processable fluorine-containing polymer having unstable groups in a kneader having a stabilization treatment zone which satisfies the following conditions:

(1) an oxygen-containing gas is present in the stabilization treatment zone,
(2) water is present in the stabilization treatment zone, and
(3) an absolute pressure in the stabilization treatment zone is adjusted to a pressure of 0.2 MPa or more or (a) an oxygen-containing gas is present in the stabilization treatment zone in a sufficient amount that the fluorine-containing polymer after the stabilization treatment has the number of carbon radical spins measured by an electron spin resonance absorption analysis at a temperature of 77 K of not more than $5 \times 10^{13}$ spin/g, and (b) water is present in the stabilization treatment zone.

34 Claims, No Drawings

METHOD OF STABILIZING FLUORINE-CONTAINING POLYMER

TECHNICAL FIELD

The present invention relates to a method of stabilizing a melt-processable fluorine-containing polymer, particularly to the method for efficiently stabilizing unstable end groups and/or unstable bonds being present in a trunk chain in a short period of time.

BACKGROUND ART

A lot of melt-processable fluorine-containing polymers are known, for example, a copolymer (FEP) of tetrafluoroethylene (TFE) and hexafluoropropylene (HFP), a copolymer (PFA) of TFE and perfluoro(alkyl vinyl ether) (PAVE), a copolymer (ETFE) of TFE and ethylene, and the like. Among such melt-processable fluorine-containing polymers, there are those which cause bubbles and cavity in a molded article produced by melt-processing. This is considered attributable to a volatile substance generated by decomposition of unstable end groups of the fluorine-containing polymer due to heat (U.S. Pat. No. 3,085,083).

The unstable end groups being present in the melt-processable fluorine-containing polymer depend on a polymerization method and kinds of a polymerization initiator, chain transfer agent, etc. For example, in case where a persulfate (ammonium persulfate, potassium persulfate or the like) which is usually used in emulsion polymerization is used as a polymerization initiator, a carboxylic acid end group is generated. The carboxylic acid end group changes to a vinyl end group (—CF=CF$_2$) or an acid fluoride end group (—COF) by melt-kneading, though it depends on melting conditions. Those end groups are thermally unstable and generate a volatile substance which causes bubbles and cavity in a final product.

In U.S. Pat. No. 3,085,083, those unstable end groups are treated in the presence of water and heat and thus are converted to stable —CF$_2$H groups. In a method described in JP-B-46-23245, unstable end groups are converted to stable end groups such as —CF$_3$ by reacting with a fluorinating agent such as fluorine gas.

Also there is a case where unstable bonds are generated in a trunk chain of a fluorine-containing polymer depending on a method of bonding of recurring units. For example, in case of a copolymer FEP of TFE-HFP, it is said that bonding of HFP with HFP is unstable and is cut by a mechanical force (shearing force) to be applied at melt-kneading, thus generating unstable vinyl end groups (U.S. Pat. No. 4,675,380).

In U.S. Pat. No. 4,675,380, a large shearing force is applied with a twin-screw extruder at melt-kneading to cut a HFP-HFP bond, thus giving an unstable end group. However in that method, since a kneading machine which is a twin-screw extruder being capable of applying a large shearing force for a short period of time is used, an object thereof is limited to cutting an unstable bond of a trunk chain and giving an unstable vinyl end, and it is not expected to treat the generated unstable end group in the twin-screw extruder. On the contrary, if oxygen is present, the vinyl end group is converted to acid fluoride end group. Therefore the fluorine-containing polymer is treated in an atmosphere being free from oxygen substantially and the fluorine-containing polymer having the vinyl end group is taken out of the twin-screw extruder as it is and then subjected to stabilizing treatment outside the extruder. Also the inside pressure of the extruder is reduced (less than 0.1 MPa in an absolute pressure) to exhaust volatile substances, etc. to be generated in the twin-screw extruder at the time of melt-kneading outside the extruder. However there arises coloration attributable to carbon generated by depolymerization of the vinyl end group.

In order to eliminate such a defect of the twin-screw extruder, in the method described in WO 98/09784, treatment for stabilizing an unstable group is carried out by using a so-called surface renewal type kneader having an effective volume ratio (effective volume in vessel/volume of vessel) larger than 0.3 at nearly an atmospheric pressure for a residence time of as long as 10 minutes or more under mild kneading condition of a power coefficient K of less than 8,000 which is represented by the equation: $K=Pv/\mu/n^2$, wherein Pv is a power required per unit volume (W/m$^3$), $\mu$ is a melt viscosity (Pa·s) of a polymer at 372° C. and n is the number of rotations (rps).

However in the long-term melt-kneading by using a surface renewal type kneader, a problem with coloring is solved, but not only lowering of a treating efficiency cannot be avoided but also depolymerization of the vinyl end group advances and deterioration of the resin easily occurs. Further a size of the treating equipment becomes large and there arises a problem that it takes a long time for replacing a resin remained in the kneader when changing the resin to be treated.

An object of the present invention is to efficiently stabilize unstable groups of a melt-processable fluorine-containing polymer in a short period of time and to provide a molded article free from bubbles and coloration.

DISCLOSURE OF INVENTION

Namely the present invention relates to the method of stabilizing a melt-processable fluorine-containing polymer having unstable groups by melt-kneading the polymer in a kneader having a stabilization treatment zone satisfying any one of the following conditions.

Condition 1
  (1) An oxygen-containing gas is present in the stabilization treatment zone, and
  (2) water is present in the stabilization treatment zone.

Condition 2
  (a) An oxygen-containing gas is present in the stabilization treatment zone in a sufficient amount that the fluorine-containing polymer after the stabilization treatment has the number of carbon radical spins measured by an electron spin resonance absorption analysis at a temperature of 77 K of 5×10$^{13}$ spins/g or less, preferably 1×10$^{13}$ spins/g or less, and
  (b) water is present in the stabilization treatment zone.

The stabilization treatment zone may be under reduced pressure, under atmospheric pressure or under pressure.

In case where the stabilization treatment zone is made being in a pressurized state, an absolute pressure thereof is adjusted to not less than 0.2 MPa, preferably not less than 0.3 MPa.

The unstable group of the fluorine-containing polymer may be present at an end of polymer chain or at an unstable bond of a trunk chain.

With respect to the method of making an oxygen-containing gas and water being present in the stabilization treatment zone, the oxygen-containing gas and/or water may be mixed previously to the fluorine-containing polymer or may be introduced into the stabilization treatment zone for the first time. It is a matter of course that the oxygen-containing gas and/or water may be mixed previously to the fluorine-containing polymer and further supplied into the stabilization treatment zone. The oxygen-containing gas is preferably air.

It is preferable that a compound containing alkali metal, alkali earth metal or ammonium salt, an alcohol, an amine or a salt thereof or ammonia which accelerates the stabilization of unstable end groups of carboxylic acid or its derivative is present in the stabilization treatment zone. Those additives may be previously mixed to the polymer or may be added in the treatment zone.

For melt-kneading, a kneader like a screw type kneader giving a relatively large shearing force may be used. Preferable examples thereof are multi-screw type kneader, particularly a twin-screw kneader.

The residence time is less than 10 minutes, preferably less than eight minutes. When the residence time is too long, it becomes difficult to eliminate heat generated by shearing and there is a case where the polymer is deteriorated.

The stabilization method of the present invention can be applied to melt-processable fluorine-containing polymers having unstable groups. The stabilization method is effectively used particularly for stabilization treatment of unstable groups of a copolymer comprising at least two monomers selected from the group consisting of tetrafluoroethylene (TFE), hexafluoropropylene (HFP), perfluoro(alkyl vinyl ether) (PAVE), ethylene (ET), vinylidene fluoride (VdF) and chlorotrifluoroethylene (CTFE), chlorotrifluoroethylene homopolymer (PCTFE) and vinylidene fluoride homopolymer (PVdF).

Examples of those fluorine-containing polymers are, for instance, a copolymer comprising 0.5 to 13% by weight of perfluoro(methyl vinyl ether) (PMVE), 0.05 to 3 % by weight of PAVE other than PMVE and a remaining amount of TFE, a TFE/HFP copolymer, particularly TFE/HFP copolymer having unstable groups prepared by emulsion polymerization, and the like.

In order to exhaust various gaseous substances generated by the treatment in the stabilization treatment zone out of the kneader, a deaeration treatment zone having an absolute pressure of not more than 0.1 MPa may be provided downstream of the stabilization treatment zone.

Further the present invention relates to pellets comprising the fluorine-containing polymer having end groups stabilized by the above-mentioned methods.

BEST MODE FOR CARRYING OUT THE INVENTION

First the melt-processable fluorine-containing polymer having unstable groups to which the present invention is applied is explained below.

Known as the melt-processable fluorine-containing polymer are, as mentioned above, a copolymer prepared by copolymerizing two or more monomers such as TFE, HFP, PAVE, ET, VdF and CTFE, CTFE homopolymer (PCTFE), VdF homopolymer (PVdF), and the like. Examples of the copolymer are, for instance, FEP polymers such as TFE/HFP copolymer (FEP) and TFE/HFP/PAVE copolymer; PFA polymers such as TFE/PAVE copolymer (PFA) and TFE/PMVE/PAVE (excluding PMVE) copolymer; ETFE polymers such as TFE/ET copolymer (ETFE); ECTFE polymers such as CTFE/ET copolymer (ECTFE); TFE/VdF copolymer; and the like.

Examples of PAVE are, for instance, vinyl ethers represented by the formula:

wherein m is an integer of 1 to 6 (PAVE when m is 1) and the formula:

wherein n is an integer of 1 to 4.

Those melt-processable fluorine-containing polymers have unstable groups more or less. Typical examples of the fluorine-containing polymer, the unstable groups of which are particularly desired to be stabilized are FEP polymers, particularly those prepared by emulsion polymerization by using, as an initiator, a persulfate which causes unstable groups. Other examples of the polymer which is strongly required to be subjected to stabilization treatment are fluorine-containing polymers prepared by the polymerization process in which ends of the polymer were not saturated with fluorine atom or hydrogen atom. Among the fluorine-containing polymers, there are obtained polymers having less unstable groups depending on the polymerization method to be employed and kind of an initiator or by using alkanes such as methane as a chain transfer agent. Some of those polymers have not been required to be subjected to stabilization treatment depending on application, but becomes further stable by the stabilization treatment of the present invention.

The stabilization treatment of the present invention can be carried out by using a kneader having a stabilization treatment zone and operated under the above-mentioned specific conditions. In the stabilization treatment zone, unstable groups are stabilized rapidly and nearly completely.

Kind of unstable group and the stabilization reaction thereof are explained below, while the explanation involves an assumption. As mentioned above, known as the unstable group are those attributable to a polymerization initiator, chain transfer agent, and the like such as a carboxylic acid group (—COOH), a vinyl group (—CF=CF$_2$) generated by modification of the carboxylic acid group due to heat, an acid fluoride group (—COF) derived from the vinyl group, and the like. Those unstable groups are usually positioned at ends of polymerization chains (trunk chain or side chain). Also there is a case where unstable bonds are generated on a bonded portion of the trunk chain of polymer depending on kind of the polymer and the preparation process. For example, while in the TFE/HFP polymer, TFE and HFP are polymerized at random, there is a case where a HFP/HPP bond recurs in the polymerization chain. This HFP/HFP bond is an unstable bond easily cut by a mechanical force (shearing force), and thus it is anticipated that unstable vinyl group and acid fluoride group are generated.

It is assumed that the reaction for stabilizing those unstable groups are as mentioned below.

Carboxylic Acid End Group

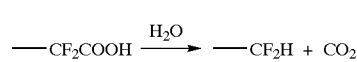
(I)

The above reaction is carried out by heating usually at 200° to 450° C., preferably 300° to 400° C.

In order to accelerate the reaction, it is effective to add a compound containing alkali metal, alkali earth metal or ammonium salt, ammonia, alcohol, amine or a salt thereof, or the like as a reaction accelerating agent. Examples thereof are hydroxides such as potassium hydroxide and sodium hydroxide, carbonates such as potassium carbonate and calcium carbonate, sulfates such as potassium sulfate, nitrates such as potassium nitrate, ammonium salt such as ammonium hydroxide, ammonia, alcohols such as methanol and ethanol, amine or a salt thereof, and the like. In case of alkali metal or alkali earth metal compounds, the end group is converted to —CF$_2$H. In case of an ammonium salt, ammonia and amine, the end group becomes an end group of acid amide (—CONH$_2$) (partly becomes an end group of —CF$_2$H at high temperature), and in case of alcohol, an end group becomes an end group of alkyl ester (—COOR).

While the reaction accelerating agent may be added previously to the fluorine-containing polymer, it is preferable to add the agent together with water from the point that the agent can be dispersed uniformly in the polymer. An adding amount thereof depends on kind of the fluorine-containing polymer to be treated. The adding amount is not more than 10%, preferably 0.1 to 10%, particularly preferably 0.2 to 5% based on the total number of unstable groups (carboxylic acid end group) in the fluorine-containing polymer when converting to the number of alkali metal atoms or alkali earth metal atoms in case of alkali metal or alkali earth metal compound, to the number of molecules of ammonia in case of ammonia and to the number of ammonium salts in case of an ammonium salt compound. When the adding amount is too large, a stabilization rate of unstable end groups is increased, but coloration of the polymer cannot be eliminated completely. Also there is a tendency that the polymer itself is deteriorated and a melt viscosity is lowered.

For stabilizing a carboxylic acid end group, there is a method of fluorination treatment by using fluorine gas, but in the present invention, the fluorination treatment is not carried out in the stabilization treatment zone. Of course, the fluorination treatment may be carried out if needed after the stabilization treatment of the present invention.

Vinyl End Group

It is presumed that the vinyl end group is generated from a carboxylic acid end group and an unstable bond of a trunk chain due to heat or a shearing force.

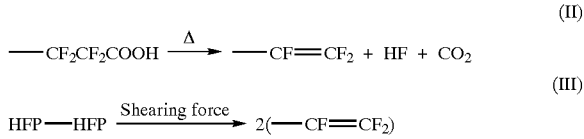

The vinyl end group is converted to a trifluoromethyl group by fluorination treatment or converted to a carboxylic acid group through an acid fluoride by the following reaction formulae.

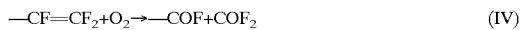

The generated carboxylic acid end group is treated by the above-mentioned method. In the above-mentioned U.S. Pat. No. 4,675,380, the reaction is terminated with the vinyl end group in the absence of oxygen substantially so that the end group is not converted to an acid fluoride which requires complicated treatment.

However if the vinyl end group is heated, as described in the following formula, depolymerization arises and carbon is generated. Therefore in the above-mentioned U.S. Pat. No. 4,675,380, a melt-kneaded product of a dark color is obtained.

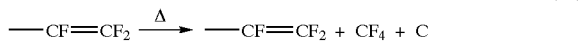

Acid Fluoride End Group

The acid fluoride end group is subjected to stabilization treatment after once returned to a carboxylic acid group according to the above-mentioned formula (V).

As mentioned above, in the stabilization treatment of the fluorine-containing polymer, in many cases, finally a reaction for stabilizing the carboxylic acid end group with water and heat becomes a rate-determining reaction, and a stabilization method minimizing depolymerization of the vinyl end group is employed. For example, in the method described in the above-mentioned publication WO 98/09784, priority is given to the stabilization reaction of carboxylic acid end group, and the stabilization treatment is carried out under the mild condition for generating the vinyl end group, namely, at nearly atmospheric pressure (about 0.1 MPa of absolute pressure in any of Examples 1 and 2 of WO 98/09784) so that carbon resulting in coloration is not generated by depolymerizatoin. Further the kneading is carried out under mild condition of a power coefficient K of less than 8,000, preferably not more than 7,000. Thus a period of time required for the stabilization treatment is longer.

On the contrary, in the present invention, by positively and uniformly making oxygen and water present in a reaction system, the vinyl end group is rapidly converted to an acid fluoride (reaction (IV)) and depolymerization is reduced to inhibit generation of carbon and prevent coloration and at the same time, by carrying out the stabilization reaction (I) of the carboxylic acid end group under pressure, the reaction is accelerated. For that purpose, it is preferable to carry out the operation in the stabilization treatment zone of the kneader under the above-mentioned specific conditions. Mentioned below are explanations of each condition.

(1) In the Presence of an Oxygen-containing Gas

Oxygen is a reaction component necessary to convert the vinyl end group to the acid fluoride end group. Further it can be expected that carbon atoms generated somewhat by the depolymerization of vinyl end group are oxidized to give a carbonic acid gas.

An amount of oxygen ($O_2$) varies depending on a reaction temperature, residence time in the stabilization treatment zone, type of extruder and kind and amount of unstable end group. It is preferable that the amount of oxygen is at least the same mole as that of the unstable end group (—CF=CF$_2$) to be stabilized or is an excess amount in consideration of diffusion loss and an amount to be exhausted without contributing to the reaction, for example, an amount of ten times or more in mole, particularly 50 to 500 times in mole.

The oxygen-containing gas may be supplied after diluted to a proper concentration (for example, 10 to 30% by volume) with an inert gas such as nitrogen gas or argon gas. It is preferable to use air as it is from economical point of view.

Oxygen may be present in the stabilization treatment zone. Oxygen may be contained in the fluorine-containing polymer before the polymer is poured into the kneader or may be supplied into the kneader after the polymer is poured into the kneader. It is a matter of course that the both methods are employed together.

(2) In the Presence of Water

Water is used in the reaction (I) for stabilizing the carboxylic acid end group and in the reaction (V) for converting acid fluoride to carboxylic acid.

It is necessary that an adding amount of water is an excess amount rather than a theoretical amount necessary for the above-mentioned reactions. Since the adding amount of water depends greatly on a pressure thereof and conditions in the kneader, it is determined in an actual operation of the kneader.

As mentioned above, the reaction (I) for stabilizing the carboxylic acid end group is greatly accelerated by adding a reaction accelerator such as an alkali metal compound, and therefore it is preferable that water is added in a state of an aqueous solution containing the accelerator. A concentration of the aqueous solution may be selected optionally based on the above-mentioned necessary amount of the accelerator.

Water may be present in the stabilization treatment zone. Water may be contained in the fluorine-containing polymer to make the polymer in a wet state before pouring the polymer into the kneader or may be supplied into the kneader after the dry polymer is poured into the kneader. It is a matter of course that the both methods are employed together. For example, it is preferable that after the polymer is treated with an aqueous solution of reaction accelerator and then dried and poured in the kneader, the kneading is carried out while supplying water and oxygen (air).

With respect to an amount of water to be supplied, theoretically the stabilization can be carried out as far as the number of water molecules is the same as the number of unstable end groups to be generated in the kneader (twin-screw extruder). Actually it is preferable to supply water in an excess amount, particularly in the number of water molecules of not less than 10 times the number of unstable end groups. An upper limit of the amount of water is not limited particularly.

Unless any specific measures are taken, usually in the polymer to be supplied into the kneader, air and water are contained like the atmospheric air. However only with such amounts of oxygen and water, an effect of the stabilization which can be achieved by the present invention cannot be exhibited. It is, assumed that the reason for that is because in the stabilization treatment zone of the kneader, low molecular weight substances and various additives (for example, polymerization initiator, etc.) are decomposed to generate gases, which decreases a partial pressure of oxygen in stabilization treatment zone and makes a contact between the polymer and oxygen insufficient.

As far as the above-mentioned conditions are satisfied, namely when an oxygen-containing gas and water are contained positively in the polymer and/or when an oxygen-containing gas and water are supplied continuously to the stabilization treatment zone, the inside of the stabilization treatment zone may be under pressure, under reduced pressure or under atmospheric pressure. Preferably an absolute pressure is adjusted to become under pressure of not less than 0.2 MPa, preferably not less than 0.3 MPa. By pressurizing, for example, introduction of water and oxygen is accelerated and the stabilization treatment can be carried out rapidly. The pressure can be measured with a pressure gauge mounted on the kneader.

An upper limit of the pressure is not more than 10 MPa, preferably not more than 5 MPa, though it varies depending on a state of melt-sealed part, type of the kneader, etc.

The pressurizing can be carried out, for example, by supplying a pressurized oxygen-containing gas which is described hereinafter and/or pressurized water or by heating the oxygen-containing gas and/or water and supplying them under self-pressure thereof.

When the polymer is melt-kneaded in the stabilization treatment zone under the above-mentioned conditions, irrespective of the end groups and unstable bonds in the trunk chain, unstable groups can be stabilized effectively in a short period of time and generation of carbon which causes coloration can be inhibited.

In the present invention, as far as the above-mentioned conditions are satisfied, even if a kneader having a power coefficient K of less than 8,000 is used, a desired result can be obtained. However in order to further shortening a treating time, it is preferable to employ stronger kneading condition, namely a power coefficient K of not less than 8,000, preferably not less than 10,000.

Examples of the kneader which can be used in the present invention are multi-screw kneader, for instance, a twin-screw extruder, a kneader having a very small effective volume ratio, etc. Among them, the twin-screw extruder is preferable because distribution of residence time is narrow, continuous operation can be achieved, and a pressure at reaction part can be increased by melt-sealing.

The stabilization treatment zone may be provided at the screw portion just after a melting zone formed by the kneading disc of the twin-screw extruder. Also it is possible that the melting zone is made longer and the latter portion thereof is used as the stabilization treatment zone.

A treating time, namely a residence time in the stabilization treatment zone varies depending on a structure of the kneader in the stabilization treatment zone, a method of supplying water and air, a treating temperature, etc. Usually the treating time of less than 10 minutes is sufficient, preferably 0.2 to 5 minutes. When the residence time is increased, a shearing force is applied more and the polymer tends to be deteriorated.

A temperature in the stabilization treatment zone is usually 200° to 450° C., preferably 300° to 400° C.

In the present invention, in order to take out gaseous substances generated in the stabilization treatment reaction, for example, fluorinated hydrogen, carbon dioxide and a small amount of monomer generated by decomposition from the inside of the fluorine-containing polymer subjected to the stabilization treatment and to exhaust the gaseous substances from the kneader, it is preferable to provide a deaeration zone having an absolute pressure maintained at 0.1 MPa or less successively after the stabilization treatment zone in the kneader. The absolute pressure in the deaeration zone is preferably a pressure reduced to such an extent that the polymer cannot enter into an exhaust nozzle, though it varies depending on a molten state of the polymer and operating conditions such as the number of rotations of the screw of extruder.

The fluorine-containing polymer obtained by the stabilization method of the present invention and discharged from the kneader is usually in the form of pellets. Even when the pellets are subjected to melt-molding, the obtained molded article is free from bubbles and cavity and coloration does not arise.

As case demands, the kneaded product (pellets) taken out of the kneader may be subjected to the above-mentioned fluorination treatment.

The present invention also relates to the method of stabilizing a melt-processable fluorine-containing polymer having unstable groups in the kneader having the stabilization treatment zone under the conditions that:

(a) an oxygen-containing gas is present in the stabilization treatment zone in a sufficient amount that the fluorine-containing polymer after the stabilization treatment has the number of carbon radical spins measured by an electron spin resonance absorption (ESR) analysis at a temperature of 77 K of not more than $5 \times 10^{13}$ spin/g, preferably not more than $1 \times 10^{13}$ spin/g, and (b) water is present in the stabilization treatment zone.

By the mentioned method, a stabilized fluorine-containing polymer having a high whiteness can be obtained.

When the fluorine-containing polymer after the stabilization treatment has the number of carbon radical spins measured by ESR analysis at a temperature of 77 K of not more than $5 \times 10^{13}$ spin/g, preferably not more than $1 \times 10^{13}$ spin/g, it indicates that a product (for example, pellets) extruded from the kneader after the stabilization treatment has a high whiteness. With respect to an extruded product of the above-mentioned U.S. Pat. No. 4,675,380, a color thereof is grey or brown, and the number of carbon radical spins is from about $8.0 \times 10^{13}$ spin/g to about $1.0 \times 10^{14}$ spin/g.

The ESR analysis is carried out in helium atmosphere under the following measuring conditions by using an equipment ESP350E available from BRUKER INSTRUMENTS INC.

Magnetic field sweeping range: 331.7 to 341.7 mT
Modulation: 100 kHz
Microwave: 0.063 mW, 9.44 GHz.

With respect to technical matters other than those explained below, for example, the fluorine-containing polymer, kneader, fluorination treatment, etc., the explanation on above-explained techniques of the invention can be applied.

In the present invention, in which an oxygen amount in the stabilization treatment zone is controlled, a pressure in the stabilization treatment zone may be under reduced pressure, under atmospheric pressure or under pressure. When the stabilization treatment is carried out under pressure, the pressure may be higher than 0.1 MPa (1 atm). Like the above-mentioned invention, the pressure is preferably 0.2 MPa or more, particularly 0.3 MPa or more from the point that a stabilization treatment time can be shortened, unnecessary deterioration of the polymer can be avoided and a length of the stabilization treatment zone can be shortened. When the stabilization treatment is carried out under pressure, it is preferable to provide a deaeration zone as mentioned above.

When the stabilization treatment is carried out under reduced pressure, it takes a time somewhat, but is advantageous because various decomposed gases and low molecular weight substances which are generated by heating can be easily taken out of the system and the deaeration treatment downstream of the stabilization treatment zone can be carried out easily.

When the stabilization treatment is carried out under reduced pressure, if water is supplied in the form of liquid, a state of reduced pressure is difficult to be formed. Therefore it is preferable to supply water in the form of humidified air obtained by adding steam to the oxygen-containing gas.

In determining the above-mentioned sufficient amount of oxygen that the fluorine-containing polymer after the stabilization treatment has the number of carbon radical spins measured by the ESR analysis at a temperature of 77 K of not more than $5 \times 10^{13}$ spin/g, preferably not more than $1 \times 10^{13}$ spin/g, there are factors of changing the oxygen amount such as components of the polymer subjected to stabilization, the number of unstable end groups and kind and amount of a stabilizing aid. Therefore the oxygen amount cannot be determined unconditionally. The stabilization treatment may be carried out actually by determining a proper oxygen amount by carrying out preliminary experiments and measuring the number of spins of carbon radical by the ESR analysis.

The present invention is then explained below by means of examples, but is not limited to them.

Methods and criteria of evaluations employed in Examples and Comparative Examples are as mentioned below. The number of spins measured by ESR analysis was measured by the above-mentioned method.

(Volatile Substance Index: VI)

The volatile substance index (VI) explained below is known as a method for evaluating an amount of volatile substances to be generated when the polymer is melt-molded (WO 98/09784).

A heat resistant vessel is charged with 10 g of a sample polymer and is put in a high temperature block maintained at 380° C. to reach the thermal equilibrium state. Thereafter a change in a pressure is recorded every 10 minutes for 60 minutes, and the volatile substance index (VI) is calculated by the following equation:

Volatile substance index=$(P_{40}-P_0) \times V/10/W$ wherein $P_0$ and $P_{40}$ are a pressure (mmHg) before putting in a high temperature block ($P_0$) and a pressure (mmHg) 40 minutes after putting in a high temperature block ($P_{40}$), respectively, V is a volume (ml) of the vessel and W is a mass (g) of the sample.

It is desirable that the volatile substance index is not more than 25. If the index exceeds 25, there arises a problem with bubbles and cavity generated at melt-processing.

(Quantitative Measurement of the Number of End Groups)

Quantitative measurement is carried out for every kind of end groups by infrared spectroscopic analysis described in U.S. Pat. No. 3,085,083, U.S. Pat. No. 4,675,380 and JP-A-4-20507. The evaluation is made by the number of end groups per $10^6$ carbon atoms.

(Degree of Coloration)

The degree of coloration is judged under the following criteria by evaluating a whiteness of the fluorine-containing polymer after melt-molding with naked eyes based on the un-treated fluorine-containing polymer before melt-molding.

A: There is no difference in color.
B: There is yellowing slightly.
C: There is yellowing apparently.
D: There is browning.

EXAMPLE 1

Stabilization treatment was carried out by using FEP (melt viscosity at 372° C.: 2.8 KPa·s) prepared by emulsion-polymerizing TFE and HFP in a ratio of 87.5/12.5 (mole ratio) by using ammonium persulfate (APS) as a polymerization initiator.

Into a twin-screw extruder having a kneading block (stabilization treatment zone) of 50 mm of axis diameter× 2,000 mm of total length was supplied, at a rate of 20 kg/hr, the above-mentioned FEP powder (containing air) which had not been subjected to a specific pre-drying treatment except that potassium carbonate was added in an amount of 20 ppm (this is a value converted to an amount of potassium and corresponds to 4.3% of the total number of unstable end groups). Pure water and air (oxygen concentration: about 20%) were supplied at the side downstream of a supply port of FEP powder in the stabilization treatment zone at a flow rate of 5.5 kg/hr and 100 NL/min, respectively. A set temperature of the stabilization treatment zone (kneading block) was 350° C., an absolute pressure was 0.6 MPa and a total time required for the whole treatment including a heat-melting time was 5 minutes (A residence time in the stabilization treatment zone is assumed to be about two minutes).

With respect to a starting FEP and FEP after the stabilization treatment, a volatile substance index (VI), the number of end groups and coloration were evaluated by the above-mentioned methods. The results are shown in Table 1.

COMPARATIVE EXAMPLE 1

A stabilization treatment was carried out in the same manner as in Example 1 except that air was not supplied, and the evaluation was carried out in the same manner. The results are shown in Table 1.

TABLE 1

|  | Example 1 | | Com. Ex. 1 | |
| --- | --- | --- | --- | --- |
|  | Before treatment | After treatment | Before treatment | After treatment |
| Volatile substance index: VI | 75 | 6.5 | 75 | 8.8 |
| Number of end groups (per $10^6$ carbon atoms) | | | | |
| —COF | 0 | 0 | 0 | 0 |
| —COOH (m) | 120 | 0 | 120 | 0 |
| —COOH (d) | 450 | 0 | 450 | 0 |
| —CF$_2$H | 0 | 480 | 0 | 300 |
| —CF=CF$_2$ | 0 | 0 | 0 | 150 |
| Number of carbon radical spins of extruded product ($\times 10^{13}$ spin/g) | — | 0.5 | — | 8.0 |
| Coloration | — | A | — | D |

EXAMPLE 2

While melt-kneading and extruding were carried out by using the same FEP and extruder as in Example 1, the stabilization treatment zone in the extruder was evacuated to −0.098 MPaG with a vacuum pump and then wetted artificial air (nitrogen/oxygen (volume)=80/20, having been subjected to wetting treatment so as to have a humidity corresponding to a saturated humidity at 80° C.) was introduced into the stabilization treatment zone in a state of reduced pressure so that the inside pressure of the stabilization treatment zone would become in a state of reduced pressure of −0.05 MPaG. While maintaining the inside pressure of the stabilization treatment zone in a state of reduced pressure, FEP powder was introduced at a rate of 5 kg/hr and the above-mentioned pseudo air was supplied continuously at a rate of 10 NL/min. A set temperature of the stabilization treatment zone was adjusted to 350° C. in the same manner as in Example 1. The obtained extruded product was evaluated in the same manner as in Example 1. The results are shown in Table 2.

TABLE 2

|  | Example 2 | |
|---|---|---|
|  | Before treatment | After treatment |
| Volatile substance index: VI | 75 | 7.5 |
| Number of end groups (per $10^6$ carbon atoms) | | |
| —COF | 0 | 5 |
| —COOH (m) | 120 | 0 |
| —COOH (d) | 450 | 0 |
| —$CF_2H$ | 0 | 475 |
| —$CF=CF_2$ | 0 | 3 |
| Number of carbon radical spins of extruded product (× $10^{13}$ spin/g) | — | 0.8 |
| Coloration | — | B |

COMPARATIVE EXAMPLE 2

While melt-kneading and extruding were carried out by using the same FEP and extruder as in Example 1, the stabilization treatment zone in the extruder was evacuated to −0.098 MPaG with a vacuum pump to remove oxygen and a slight amount of water (liquid) was introduced into the stabilization treatment zone in a state of reduced pressure so that the inside pressure of the stabilization treatment zone would become in a state of reduced pressure of −0.09 MPaG. While maintaining the inside pressure of the stabilization treatment zone in the state of reduced pressure, FEP powder was introduced at a rate of 5 kg/hr and water was supplied continuously at a rate of 0.1 kg/hr. A set temperature of the stabilization treatment zone was adjusted to 350° C. in the same manner as in Example 1. The obtained extruded product was evaluated in the same manner as in Example 1. The results are shown in Table 3.

COMPARATIVE EXAMPLE 3

While melt-kneading and extruding were carried out by using the same FEP and extruder as in Example 1, the stabilization treatment zone in the extruder was evacuated to −0.098 MPaG with a vacuum pump to remove oxygen and a slight amount of water (liquid) and nitrogen gas were introduced into the stabilization treatment zone in a state of reduced pressure so that the inside pressure of the stabilization treatment zone would become in a pressurized state of 0.2 MPaG. While maintaining the inside pressure of the stabilization treatment zone in the pressurized state, FEP powder was introduced at a rate of 5 kg/hr and water and nitrogen gas were supplied continuously at a rate of 0.1 kg/hr and 10 NL/min, respectively. A set temperature of the stabilization treatment zone was adjusted to 350° C. in the same manner as in Example 1. The obtained extruded product was evaluated in the same manner as in Example 1. The results are shown in Table 3.

TABLE 3

|  |  | After treatment | |
|---|---|---|---|
|  | Before treatment | Com. Ex. 2 | Com. Ex. 3 |
| Volatile substance index: VI | 75 | 7.5 | 8.0 |
| Number of end groups (per $10^6$ carbon atoms) | | | |
| —COF | 0 | 2 | 3 |
| —COOH (m) | 120 | 0 | 0 |
| —COOH (d) | 450 | 0 | 0 |
| —$CF_2H$ | 0 | 315 | 323 |
| —$CF=CF_2$ | 0 | 120 | 102 |
| Number of carbon radical spins of extruded product (× $10^{13}$ spin/g) | — | 9.2 | 10.0 |
| Coloration | — | D | D |

INDUSTRIAL APPLICABILITY

According to the stabilization method of the present invention, unstable groups of melt-processable fluorine-containing polymer having unstable groups can be stabilized rapidly and effectively, and even if the obtained stabilized polymer is melt-molded, an obtained molded article is free from bubbles and cavity and no coloration arises.

What is claimed is:

1. A method of stabilizing a fluorine-containing polymer by melt-kneading a melt-processable fluorine-containing polymer having unstable groups in a screw extruder having a stabilization treatment zone which satisfies the following conditions:

(1) an oxygen-containing gas is present in the stabilization treatment zone such that oxygen is present in at least an equimolar amount as that of an unstable end group —$CF=CF_2$, and (2) water is present in the stabilization treatment zone.

2. The stabilization method of claim 1, wherein the oxygen-containing gas is supplied into the stabilization treatment zone.

3. The stabilization method of claim 1, wherein said screw extruder is a twin-screw extruder.

4. The stabilization method of claim 1, wherein an absolute pressure in the stabilization treatment zone is adjusted to a pressure of less than 0.1 MPa.

5. The stabilization method of claim 1, wherein said oxygen-containing gas is air.

6. The stabilization method of claim 1, wherein a compound containing an alkali metal, alkali earth metal or ammonium salt, an alcohol, an amine or a salt thereof, or ammonia is present in said stabilization treatment zone.

7. A method of stabilizing a fluorine-containing polymer by melt-kneading a melt-processable fluorine-containing polymer having unstable groups in a kneader having a stabilization treatment zone which satisfies the following conditions:

(1) an oxygen-containing gas is present in the stabilization treatment zone such that oxygen is present in at least an equimolar amount as that of an unstable end group —$CF=CF_2$, (2) water is present in the stabilization treatment zone, and (3) an absolute pressure in the stabilization treatment zone is adjusted to a pressure of 0.2 MPa or more.

8. The stabilization method of claim 7, wherein the unstable groups of the fluorine-containing polymer are end groups and/or bonded parts of trunk chain of the polymer.

9. The stabilization method of claim 7, wherein the oxygen-containing gas and/or water are pre-mixed to the fluorine-containing polymer, and in addition to the pre-mixing or without the pre-mixing, the oxygen-containing gas and/or water are supplied in the stabilization treatment zone.

10. The stabilization method of claim 7, wherein an absolute pressure in the stabilization treatment zone is adjusted to a pressure of 0.3 MPa or more.

11. The stabilization method of claim 7, wherein said oxygen-containing gas is air.

12. The stabilization method of claim 7, wherein a compound containing an alkali metal, alkali earth metal or ammonium salt, an-alcohol, an amine or a salt thereof, or ammonia is present in said stabilization treatment zone.

13. The stabilization method of claim 7, wherein said kneader is a multi-screw kneader.

14. The stabilization method of claim 13, wherein said multi-screw kneader is a twin-screw extruder.

15. The stabilization method of claim 7, wherein the fluorine-containing polymer is a copolymer comprising at least two monomers selected from the group consisting of tetrafluoroethylene, hexafluoropropylene, perfluoro(alkyl vinyl ether), ethylene, vinylidene fluoride and chlorotrifluoroethylene, chlorotrifluoroethylene homopolymer or vinylidene fluoride homopolymer.

16. The stabilization method of claim 15, wherein the fluorine-containing polymer is a copolymer comprising 0.5 to 13% by weight of perfluoro(methyl vinyl ether), 0.05 to 3% by weight of perfluoro(alkyl vinyl ether) other than said perfluoro(methyl vinyl ether) and a remaining amount of tetrafluoroethylene.

17. The stabilization method of claim 15, wherein the fluorine-containing polymer is a copolymer comprising tetrafluoroethylene and hexafluoropropylene.

18. The stabilization method of claim 15, wherein the fluorine-containing polymer is a copolymer having unstable groups and prepared by emulsion polymerization.

19. The stabilization method of claim 7, wherein said kneader has a deaeration zone adjusted to an absolute pressure of 0.1 MPa or less in the downstream of the stabilization treatment zone.

20. A method of stabilizing a fluorine-containing polymer by melt-kneading a melt-processable fluorine-containing polymer having unstable groups in a kneader having a stabilization treatment zone which satisfies the following conditions:

(a) an oxygen-containing gas is present in the stabilization treatment zone in a sufficient amount that the fluorine-containing polymer after the stabilization treatment has the number of carbon radical spins measured by an electron spin resonance absorption analysis at a temperature of 77 K of $1 \times 10^{13}$ spins/g or less, and (b) water is present in the stabilization treatment zone.

21. The stabilization method of claim 20, wherein a pressure in the stabilization treatment zone is in the state of a reduced pressure.

22. The stabilization method of claim 20, wherein a pressure in the stabilization treatment zone is in the state of atmospheric pressure or in a pressurized state.

23. The stabilization method of claim 20, wherein said unstable groups of the fluorine-containing polymer are end groups and/or bonded parts of a trunk chain of the polymer.

24. The stabilization method of claim 20, wherein the oxygen-containing gas and/or water are pre-mixed to the fluorine-containing polymer, and in addition to the pre-mixing or without the pre-mixing, the oxygen-containing gas and/or water are supplied in the stabilization treatment zone.

25. The stabilization method of claim 20, wherein the oxygen-containing gas is air.

26. The stabilization method of claim 20, wherein a compound containing an alkali metal, alkali earth metal or ammonium salt, an alcohol, an amine or a salt thereof, or ammonia is present in said stabilization treatment zone.

27. The stabilization method of claim 20, wherein said kneader is a multi-screw kneader.

28. The stabilization method of claim 27, wherein said multi-screw kneader is a twin-screw extruder.

29. The stabilization method of claim 20, wherein the fluorine-containing polymer is a copolymer comprising at least two monomers selected from the group consisting of tetrafluoroethylene, hexafluoropropylene, perfluoro(alkyl vinyl ether), ethylene, vinylidene fluoride and chlorotrifluoroethylene, chlorotrifluoroethylene homopolymer or vinylidene fluoride homopolymer.

30. The stabilization method of claim 29, wherein the fluorine-containing polymer is a copolymer comprising 0.5 to 13% by weight of perfluoro(methyl vinyl ether), 0.05 to 3% by weight of perfluoro(alkyl vinyl ether) other than said perfluoro(methyl vinyl ether) and a remaining amount of tetrafluoroethylene.

31. The stabilization method of claim 29, wherein the fluorine-containing polymer is a copolymer comprising tetrafluoroethylene and hexafluoropropylene.

32. The stabilization method of claim 29, wherein the fluorine-containing copolymer is a copolymer having unstable groups and prepared by emulsion polymerization.

33. The stabilization method of claim 20, wherein said kneader has a deaeration zone adjusted to an absolute pressure of 0.1 MPa or less in the downstream of the stabilization treatment zone.

34. Pellets comprising the fluorine-containing polymer continuing —$CF_2H$ end group. and having the number of carbon radical spins measured by an electron spin resonance absorption analysis at a temperature of 77 K of $1 \times 10^{13}$ spins/g or less.

* * * * *